J. W. BEASLEY, Jr.
WATERING CAN.
APPLICATION FILED JULY 20, 1920.

1,432,587.

Patented Oct. 17, 1922.

INVENTOR.
J. W. Beasley Jr.
BY
ATTORNEY.

Patented Oct. 17, 1922.

1,432,587

UNITED STATES PATENT OFFICE.

JOHN W. BEASLEY, JR., OF LOS ANGELES, CALIFORNIA.

WATERING CAN.

Application filed July 20, 1920. Serial No. 397,720.

*To all whom it may concern:*

Be it known that I, JOHN W. BEASLEY, Jr., a citizen of the United States, residing at Los Angeles, in the county of Los Angeles and State of California, have invented certain new and useful Improvements in Watering Cans; and I do hereby declare the following to be a full, clear, and exact description of the invention, such as will enable others skilled in the art to which it appertains to make and use the same.

This invention relates to new and useful improvements in watering or drinking cans for poultry and has for its primary object the provision of a device that will maintain the water in a sanitary condition and prevent the poultry from walking in the water or getting their feet wet when about the device.

Another object of this invention is the provision of a drinking can that includes a few parts which when assembled provides a very compact device and one that may be readily separated for cleaning.

A further object of this invention is the provision of a watering or drinking can of the above stated character which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1:
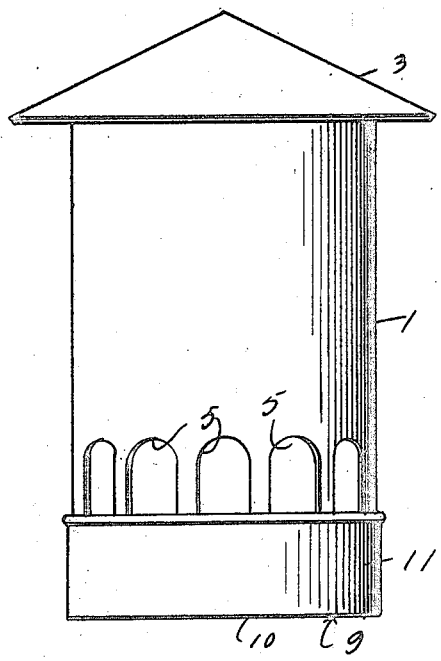
Figure 2:
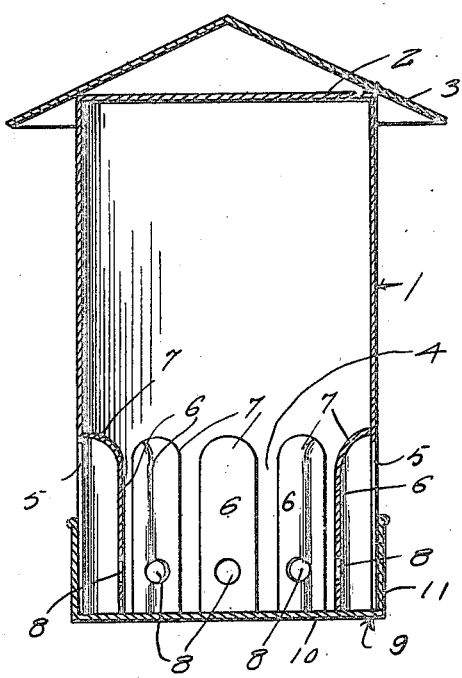
Figure 3:
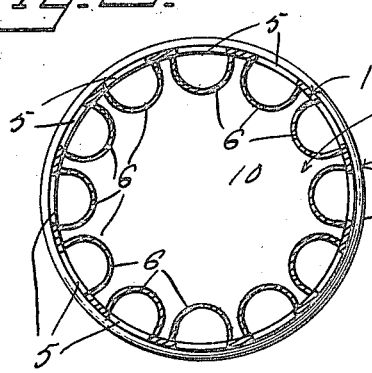
Figure 4:
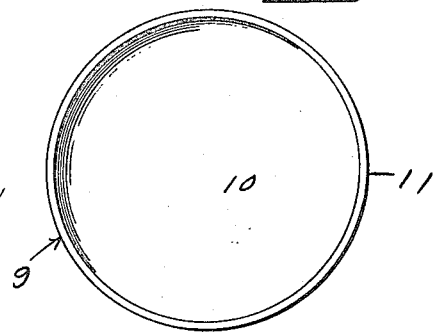

Figure 1 is a side elevation illustrating a watering or drinking can constructed in accordance with my invention, Figure 2 is a vertical sectional view illustrating the same, Figure 3 is a transverse sectional view illustrating the drinking compartment, Figure 4 is a detail view illustrating the bottom.

Referring in detail to the drawing, the numeral 1 indicates a cylindrical body having its upper end closed by a top wall 2 and its lower end fully open. A substantially conical shaped cover 3 is secured to the upper end of the body 1 and projects beyond the sides thereof to prevent draining of rain water into the drinking compartments 4. The wall of the body 1 is provided with a series of entrances 5 which are of a sufficient height to permit the fowl when drinking to raise and lower its head. The entrances 5 are formed by cutting slots in the wall of the body and which slots open outwardly through the lower end of the body. A plurality of partitions 6 are secured to the inner face of the wall of the body 1 about the entrances 5 and are substantially U-shape in cross section having their edges secured in any desired manner to the body while their upper ends are extended and curved as illustrated at 7 and secured to the inner face of the wall of the body so as to form the drinking compartments. The partitions 6 are each provided with an opening 8 permitting fluid from the interior of the body 1 to enter the compartment 4 and be accessible to the poultry by the poultry inserting their heads through the entrance ways 5.

A bottom 9 consisting of a bottom wall 10 and an upstanding annular wall 11 is positioned on the lower end of the body 1 for the purpose of closing the same and also closing the lower end of the drinking compartments 4 and providing a construction whereby the interior of the body may be readily cleansed and filled by removing the bottom. The upstanding wall 11 of the bottom 9 has frictional engagement with the outer face of the wall of the body so as to retain the bottom 9 on the device.

While I have shown and described the preferred embodiment of my invention, it will be understood that minor changes in construction, combination and arrangement of parts may be made without departing from the spirit and scope of the invention as claimed.

Having thus described my invention, what I claim is:

A device of the class described having a container with its outer wall provided with an endless row of openings and strips intermediate the openings, a separable base having a side wall throughout in flat intimate frictional engagement with the exterior of the strips, said openings extending above said side wall, partitions secured to the interior of the strips and adjacent portions of the container wall and spaced from said side wall to form compartments, and said partitions having openings therethrough to establish communication between the container and compartments.

In testimony whereof I affix my signature in presence of two witnesses.

JOHN W. BEASLEY, Jr.

Witnesses:
 FRED C. J. SOMMER,
 GAPER D. TRAPANL.